United States Patent [19]

Rose

[11] Patent Number: 5,035,537

[45] Date of Patent: Jul. 30, 1991

[54] METHOD OF DECONTAMINATING SOIL, POROUS ROCK AND THE LIKE

[76] Inventor: James L. Rose, 4654 Vicksburg Dr., Sylvania, Ohio 43560

[21] Appl. No.: 596,692

[22] Filed: Oct. 12, 1990

[51] Int. Cl.⁵ .......................... B09B 3/00; E02D 3/00
[52] U.S. Cl. .................................. 405/128; 405/258; 405/270
[58] Field of Search ............... 405/128, 129, 258, 263, 405/264, 270; 210/747, 922

[56] References Cited

U.S. PATENT DOCUMENTS

| | | | |
|---|---|---|---|
| 4,519,338 | 5/1985 | Kramer et al. | 405/129 X |
| 4,643,111 | 2/1987 | Jones | 405/129 X |
| 4,758,355 | 7/1988 | Levine | 210/747 |
| 4,842,448 | 6/1989 | Koerner et al. | 405/258 |
| 4,927,293 | 5/1990 | Campbell | 405/128 |
| 4,945,988 | 8/1990 | Payne et al. | 405/128 X |
| 4,957,393 | 9/1990 | Buelt et al. | 405/128 |

Primary Examiner—David H. Corbin
Attorney, Agent, or Firm—Willian, Brinks, Olds, Hofer, Gilson & Lione

[57] ABSTRACT

A method of treating soil, porous rock and similar material contaminated by petroleum, hydrocarbon and volatile organic compounds includes the steps of gathering the contaminated soil, dispersing it uniformly on an impervious horizontal surface to a depth of about four to six inches, treating it with an emulsifying agent and allowing the emulsifying agent to seep through the soil and volatilize the hydrocarbon and organic compounds in the soil. Optionally, the vapors emanating from the soil may be collected and burned. After treatment, the soil or porous rock is substantially free of the contaminants and may be returned to its former location or another, if desired.

20 Claims, 2 Drawing Sheets

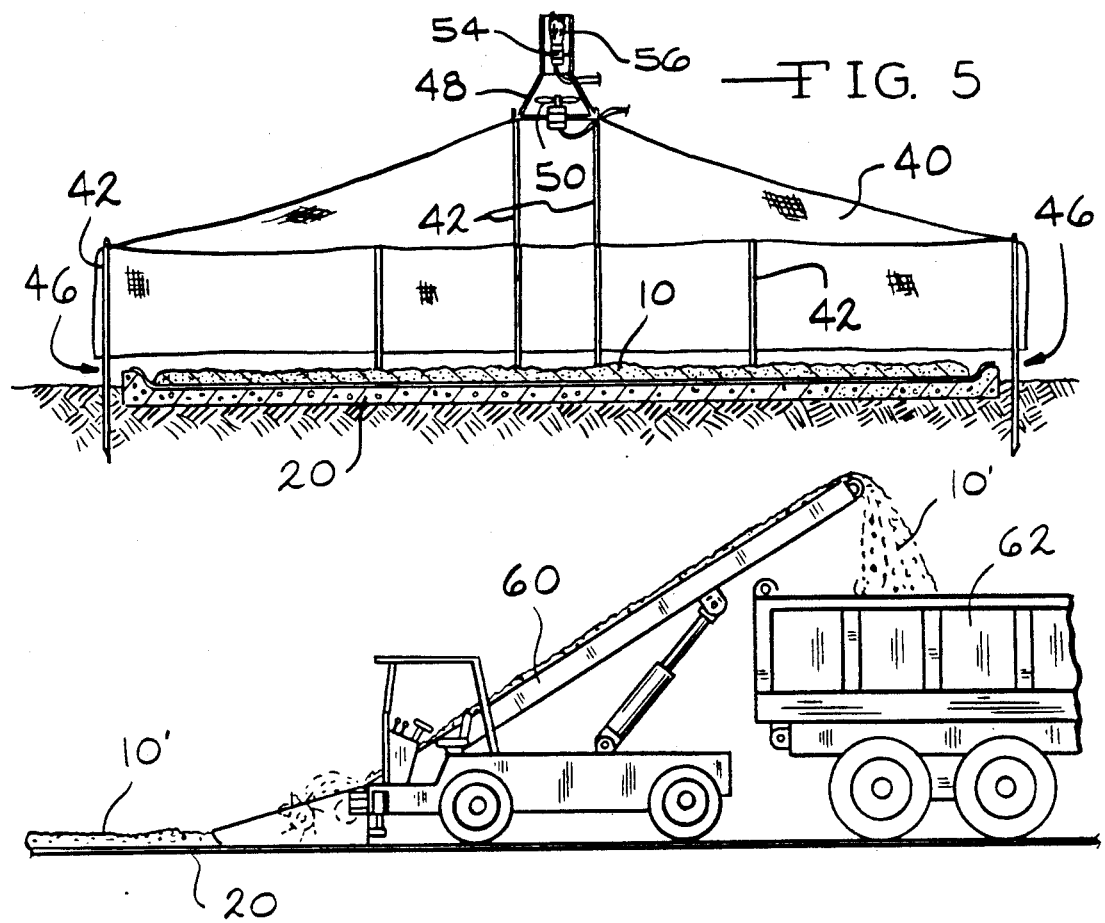
FIG. 5
FIG. 6
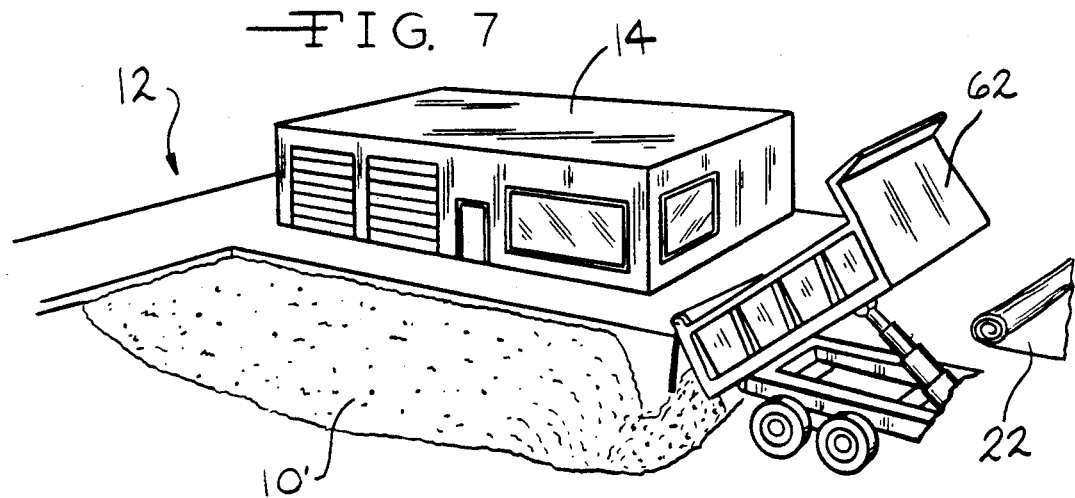
FIG. 7

METHOD OF DECONTAMINATING SOIL, POROUS ROCK AND THE LIKE

BACKGROUND OF THE INVENTION

The present invention relates to a method of decontaminating soil, and more specifically, to a method of decontaminating soil, porous rock and the like contaminated by hydrocarbon, petroleum based and organic compounds by treatment with an emulsifying and volatilizing agent.

Concern for the environmental stability of the earth and its fragile ecosystems has altered many aspects of commerce. Recycling of glass and metal containers, municipal sewage treatment and energy conservation are primarily products of the last four decades. Since the passage of the Clean Air Act (CAA) in 1970, this bill and subsequent legislation has empowered the government to act to control and reduce environmental pollution from motor vehicles, factories, municipalities and other commercial activities.

One of the underlying ecological precepts of the public and the governmental environmental programs as well, is the very real limits on both the quantities of natural resources that are available and the extent to which life supporting systems such as lakes and waterways, soil and plant life may be abused without having serious and long lasting effects on directly or remotely related environmental systems.

For example, at one time no questions were asked when hydrocarbon fuels, petroleum distillates and organic chemicals were spilled or discharged into waterways or the soil. Later, questions were raised as to whether the discharge of such materials into waterways, aquifers, or soil might have long term deleterious effects. Now, the question is unequivocally answered in the affirmative. Accordingly, efforts are underway not only to eliminate such occurrences, but to clean and clear areas where such contamination has occurred in the past.

Treatment of such hydrocarbon and petroleum distillate contaminated soil presents significant problems. In light of these problems, one of the most common treatments has been simply to move such soil or similar material such as porous rock to a landfill where it will be perpetually isolated from the environment. Such perpetual isolation frequently lasts only so long as steel drums take to rust or a clay dike takes to develop leaks. Then, the material is moved to another perpetual storage area.

Methods have been proposed in the patent art for isolation of contaminants and detoxification of soil and the like. For example, U.S. Pat. No. 4,645,382 teaches a method of isolating and containing soil contaminants. The method disclosed therein comprehends the installation of a layer of sealing material such as alkali silicate to form an impermeable barrier which isolates the contaminated soil region.

U.S. Pat. No. 4,839,061 teaches a method and apparatus for treating hazardous material spills. Here, an unspecified chemical reagent is utilized in a mechanized boom having a pick up head with sensors, spray jets and suction inlets. The apparatus is intended to speed treatment and collection of spills of hazardous material.

U.S. Pat. No. 4,913,586 teaches another method for treating soil contaminated by pollutants such as petroleum and hydrocarbon liquid. The patent is directed to a material which protectively coats each particle of contaminated soil to inhibit the volatilization or release of the toxic components from the soil particles.

From the foregoing, it is apparent that while processes for dealing with hydrocarbon and organic contaminants in soil exist, none deal with the actual reclamation of the soil, that is, returning it to its original, pristine, unspoiled state by removing the hydrocarbon contaminants such that the soil may again be used as clean, uncontaminated soil. The present invention relates to such a process.

SUMMARY OF THE INVENTION

A method of treating soil and porous rock contaminated by hydrocarbon and volatile organic compounds includes the steps of gathering the contaminated soil, dispersing it uniformly on a impervious horizontal surface to a depth of preferably four to six inches and treating it with an emulsifying agent. The emulsifying agent may be applied by conventional manual or mechanized spray techniques or may be dispersed throughout the soil in a mechanical mixer. The emulsifying agent then seeps through the soil and volatilizes the hydrocarbon and organic compounds in the soil. If desired or required by statute or local codes, a vapor impervious shell may be positioned over the treatment area, the vapor collected and burned. After treatment, the soil or porous rock is substantially free of the contaminants and may be returned to its former location or another, if desired.

Thus it is the object of the present invention to provide a method of treating soil, porous rock and the like which has been contaminated by petroleum, hydrocarbon and organic compounds which returns the soil to its uncontaminated condition.

It is a further object of the present invention to provide a method of treating petroleum, fuel, hydrocarbon and organic compound contaminated soil with a emulsifying agent to remove such contaminants from the soil.

It is a still further object of the present invention to provide a method of removing petroleum, hydrocarbon and organic compounds from soil and incinerating such removed contaminants.

It is a still further object of the present invention to provide a soil treatment method which may be expeditiously and inexpensively accomplished to return contaminated soil to its uncontaminated state.

Further objects and advantages of the present invention will become apparent by reference to the following specification and attended drawings.

BRIEF DESCRIPTION OF THE DRAWINGS

FIG. 5 is a sectional view illustrating a vapor collecting and incinerating shroud disposed over the horizontal surface;

FIG. 6 is a perspective view of the decontaminated soil being removed by suitable apparatus from the fluid impermeable horizontal surface; and FIG. 7 is a perspective view of the soil being returned to its original location after treatment.

DESCRIPTION OF THE PREFERRED EMBODIMENT

Figure 1:
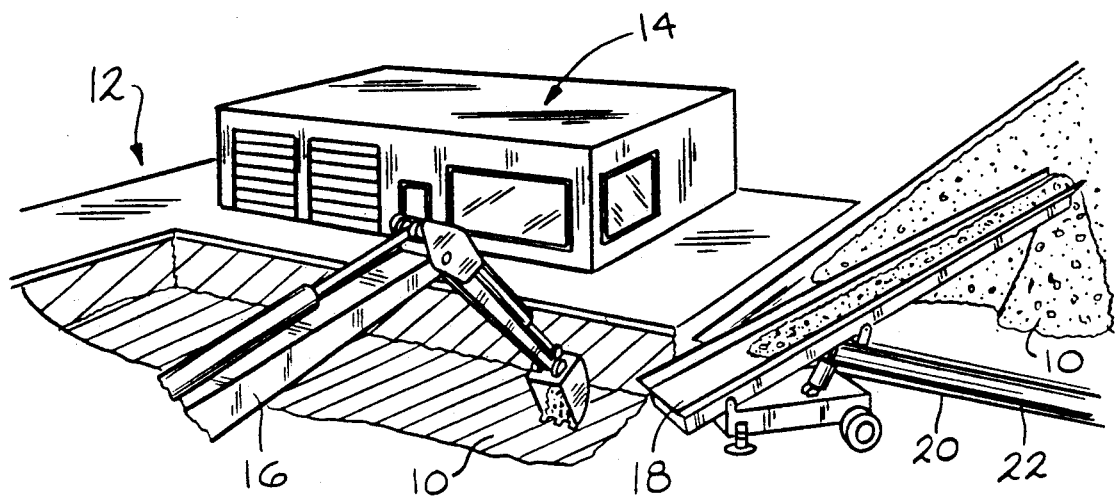
FIG. 1 is a perspective view of a site having contaminated soil which is to be treated.
Figure 2:
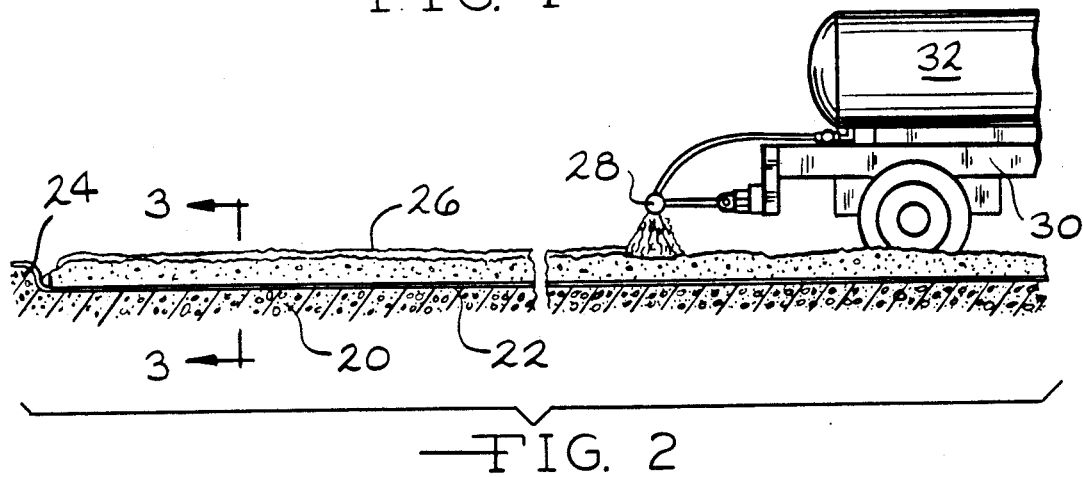
FIG. 2 is a sectional view of the contaminated soil spread upon a fluid impermeable horizontal surface to which an emulsifying agent is being applied.

Referring now to FIGS. 1 and 2, the initial steps of a soil decontamination method according to the present invention will be described. The method is useful to decontaminate and detoxify soil, porous rock and similar substances capable of absorbing, in either liquid form or more diffuse and dispersed vapor form, hydrocarbon, petro-chemical and organic materials. The contaminated soil 10 is removed from a site 12 which may be or may have been the location of a filling station 14 having underground storage tanks (not illustrated) or a factory using such materials. Alternatively, the site 12 may simply be an area of land upon which such materials were disposed or stored. The soil 10 from the site 12 may be removed by any suitable means such as a backhoe 16 or, for example, earth moving equipment (not illustrated) at a large site 12, or manual labor in the case of a site 12 of limited size.

The soil 10 may then be transported by suitable means such as a conveyor 18 onto a preferably horizontal fluid impervious treatment pad or surface 20. The treatment surface 20 may be any suitable expanse of material such as concrete which is well sealed at cracks and joints to inhibit fluid flow into the supporting soil. Such imperviousness may be ensured by placement of sheet material 22 such as polyethylene, PVC or other suitable hydrocarbon resistant thin film material onto the treatment surface 20.

The treatment surface 20 may be at the site 12 of the contaminated soil 10 or may be at any convenient distance therefrom, in which case conventional dump trucks and other earth moving equipment (both not illustrated) may be utilized in place of the conveyor 18 to haul and disperse the contaminated soil 10 onto the treatment surface 20. Preferably, a curb or berm 24 of concrete or soil, respectively, may be disposed about the periphery of the treatment surface 20 to assist containment of the soil 10 during the treatment process.

As illustrated in FIGS. 1 and 2, the contaminated soil 10 is then preferably dispersed upon the treatment surface 20 to a thickness of between about 4 and 6 inches. The required area of treatment surface 20 for a given volume of material to be treated in a single treatment process is given by the formula:

$$\text{Surface Area} = \text{Volume} \times \frac{36}{T}$$

where
  Surface Area = the area of surface 20 in square yards
  Volume = the volume of soil 10 or other material to be treated in cubic yards and
  T = the nominal thickness to which the soil 10 or other material is spread over the treatment surface 20 in inches The preferred depth or thickness to which the contaminated soil 10 is dispersed over the treatment surface is 6 inches, but the range of from 4 to 6 inches has been found operable and it is understood that thinner layers provide the most rapid treatment to soil, particularly soil which is heavily contaminated, though occupying a greater area, and that thicker layers are functional with lower contaminant levels and in situations where slower processing is acceptable.

Figures 3, 4:
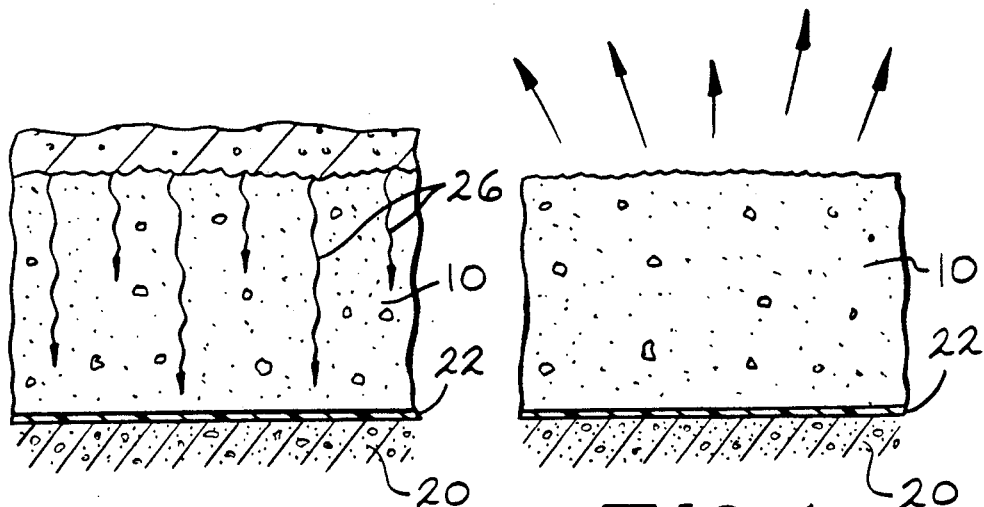
FIG. 3 is an enlarged, sectional view illustrating the emulsifying agent as it seeps through and saturates the soil.
FIG. 4 is an enlarged, sectional view illustrating the volatilization of the contaminants after contact with the emulsifying agent.

Referring now to FIGS. 2 and 3, the substantially uniformly dispersed contaminated soil 10 disposed on the treatment surface 20 is next treated with an emulsifying agent 26 such as EDF manufactured by SynTech Products Corporation of Toledo, Ohio. This emulsifying agent is a mixture of:
  Sodium xylene sulfanate
  Polypropylene glycol
  Octylphenoxy polyethoxyethanol nonionic surfactant
  Alcohol/water based surfactant
  Anionic/nonionic surfactant blend and
  Water The emulsifying agent is utilized in a dilute solution with water to a concentration of approximately 6% although the range up from 3 to 20% has been found to be operable.

The dilute emulsifier/water solution 26 is applied to the surface of the contaminated soil 10 as a liquid foam in sufficient quantities to completely saturate the soil 10. A typical consumption ratio for the dilute emulsifier/water solution 26 is between about 10 gallons and 16.6 gallons per cubic yard of treated soil 10, the optimum figure being about 13.5 gallons per cubic yard. In terms of the concentrated emulsifier, the use is approximately 0.6 gallon to 1.00 gallon per cubic yard of treated soil 10, the optimum amount being about 0.8 gallon per cubic yard. Once again, it will be appreciated that the quantity of emulsifying agent used will be dependent upon the quantity and the degree of concentration of contaminants in the soil 10.

The dilute emulsifier/water solution 26 may be applied to the soil by a suitable spray bar or sprayer 28 disposed upon a vehicle 30 having a tank 32 for holding the dilute emulsifier/water solution 26. Alternatively, the material may be sprayed by hand or any other mechanized or manual means which will ensure uniform and sufficient application of emulsifier/water solution 26 to completely saturate the contaminated soil 10. Alternatively, the contaminated soil 10 and emulsifier/water solution 26 may be mixed together to a high degree of uniformity in a rotating drum mixer (not illustrated) or similar mechanical mixer. Such mechanical mixing facilitates uniform dispersal of the emulsifier/water solution 26 throughout the contaminated soil 10. It will be understood that if mechanical mixing is utilized, such step is preferably performed before the soil 10 is dispersed on the treatment surface 20.

Referring now to FIG. 4, the contaminated soil 10 upon which the emulsifier/water solution 26 has been uniformly dispersed is next permitted to set for 24 to 72 hours. During this period, the emulsifier/water solution 26 is in contact with the hydrocarbon molecules and encases or encapsulates them. While this process is not fully understood, it is believed that the emulsifier/water solution 26 exhibits a surface tension comparable to those of many petroleum and hydrocarbon distillates such that it encases and displaces them in the soil 10. Ultimately the encapsulated hydrocarbon molecules are volatilized through the agency of the emulsifier/water solution 26 and both evaporate into the atmosphere leaving the soil substantially free of petroleum and hydrocarbon contaminants.

Referring next to FIG. 5, during this volatilizing step, it may be desirable or, in fact, required by statute or local codes, that the volatilized material be collected and incinerated. Accordingly, a vapor impervious tent or shroud 40 of canvas, polyethylene, PVC or similar material may be supported by a plurality of stakes or poles 42 disposed generally about the periphery of the treatment surface 20 defined by the curb or berm 24. Preferably, an interval or gap several inches high is left between the lower edge of shroud 40 and the adjacent ground to form an air passageway 46. The air passageway 46 is exaggerated in height in FIG. 5. The air passageway 46 facilitates the influx of air into the tent or shroud 40. Preferably, centrally located within the shroud 40, is a stack or vent 48 supported on the poles 42 having a blower or fan 50 for drawing air and volatilized contaminants from the interior of the shroud 40 and moving them up the vent 48 to a gas burner 54. The gas burner 54 is supplied with, for example, natural or LP gas and maintains a flame 56 which burns off the volatilized contaminants. The air, free of such contaminants, then passes out the vent 48 and into the surrounding atmosphere.

The process is preferably undertaken above an ambient temperature of 32° F. (0° Celsius) and ideally above an ambient temperature of 40° F. (5° Celsius). It will thus be appreciated that if ambient conditions require it, the process according to the instant invention may be undertaken in a heated space, i.e., indoors or in a heated and/or insulated tent or shroud 40.

Referring now to FIG. 6, the decontaminated soil 10' is collected by suitable manual or automatic means such as a mechanized self-loading soil conveyor 60 from the treatment surface 20 into a suitable dump truck 62.

Finally, as illustrated in FIG. 7, the decontaminated soil, porous rock or similar material 10' may be emptied from the dump truck 62 either at the original site 12 or at some other location.

The process of the present invention is effective with a broad range of aliphatic, aromatic and halogenated hydrocarbons. The treatment is especially effective with such hydrocarbons having a vapor pressure of approximately 0.5 mm Hg at 68° F. (20° Celsius). This includes numerous petroleum products and hydrocarbon fuels, the more common being benzene, xylene, toluene, No. 1 fuel oil, No. 2 fuel oil, kerosene, white gas, standard gasoline, jet fuel, lacquer, naphtha, mineral spirits (paint thinner), acetone and turpentine. It should be understood that the foregoing delineation is merely representative of the hydrocarbon, petroleum and organic materials effectively removed from soil 10 by the instant process. Numerous other materials, hydrocarbon and organic materials may also be expeditiously removed.

After treatment, the detected levels of hydrocarbons in the uncontaminated soil 10' will be sufficiently low that the soil may be reclassified as non-hazardous.

The foregoing disclosure is the best mode devised by the inventor for practicing this invention. It is apparent, however, that methods incorporating modifications and variations will be obvious to one skilled in the art of soil reclamation. Inasmuch as the foregoing disclosure is intended to enable one skilled in the pertinent art to practice the present invention, the invention should not be construed as being limited by such disclosure, but should be construed to include such aforementioned obvious variations and be limited only by the spirit and scope of the following claims.

I claim:

1. A method of treating contaminated soil and the like comprising the steps of:
   removing contaminated soil from a site,
   providing a fluid impervious surface for receiving said contaminated soil,
   dispersing said contaminated soil on said fluid impervious surface at a thickness of at least about four inches,
   applying an emulsifier/water solution to said soil,
   allowing said emulsifier/water solution treated soil to remain on said surface for at least about 24 hours,
   whereby contamination in said soil is volatilized by said emulsifier/water solution.

2. The method of claim 1 further including the step of providing a fluid impervious membrane on said fluid impervious surface.

3. The method of claim 1 further including the step of collecting the volatilized materials and burning them in an open flame.

4. A method of claim 1 further including the step of returning said soil to said site.

5. A method of claim 1 wherein said contaminated soil is dispersed on said surface at a depth of about six inches.

6. The method of claim 1 wherein said emulsifier/water solution is applied to said contaminated soil at a ratio of between about 10 and 16.6 gallons per cubic yard of contaminated soil.

7. The method of claim 1 wherein said applying step is accomplished in a mechanical mixer before said dispersing step.

8. A method of decontaminating soil, porous rock and like material comprising the steps of:
   removing contaminated material from a site,
   providing a substantially horizontal liquid impermeable surface for receiving said contaminated material,
   placing said contaminated material on said liquid impermeable surface,
   dispersing an emulsifier solution on said contaminated soil,
   maintaining said contaminated material treated with said emulsifier solution on said surface for at least about 24 hours,
   whereby contaminants in said contaminated material are volatilized by said emulsifier solution.

9. The method of claim 8 further including the step of providing a fluid impervious membrane on said fluid impervious surface.

10. The method of claim 8 further including the steps of placing a vapor impermeable shroud over said surface and collecting the volatilized material.

11. A method of claim 8 further including the step of returning said soil to said site.

12. A method of claim 8 wherein said contaminated soil is dispersed on said surface at a depth of about six inches.

13. The method of claim 8 wherein said emulsifier solution is a dilute emulsifier/water solution applied to said contaminated soil at a ratio of between about 10 and 16.6 gallons per cubic yard of contaminated soil.

14. The method of claim 8 wherein said emulsifier solution is between about 5% and 10% emulsifier and 90% to 95% water.

15. A method of treating soil, porous rock and the like contaminated with petroleum products, hydrocarbon distillates or organic compounds, comprising the steps of:

removing such contaminated material from a site, providing a substantially horizontal, fluid impervious surface for receiving said contaminated material, disposing said contaminated material on said fluid impervious surface at a thickness of at least about four inches, contacting said contaminated material with an emulsifier/water solution, and maintaining said contaminated material on said surface after contacting it with said emulsifier/water solution for at least about 24 hours, whereby contaminants in said material are volatilized by said emulsifier/water solution.

16. The method of claim 15 further including the step of providing a fluid impervious membrane on said fluid impervious surface.

17. The method of claim 15 further including the steps of providing a vapor impermeable shroud over said surface and incinerating said vapors collected in said shroud.

18. A method of claim 15 further including the step of returning said decontaminated material to said site.

19. A method of claim 15 wherein said contaminated material is disposed on said surface at a depth of about six inches.

20. The method of claim 15 wherein said emulsifier/water solution is applied to said contaminated material at a ratio of between about 10 and 16.6 gallons per cubic yard of contaminated material.

* * * * *